(12) United States Patent
Schneider et al.

(10) Patent No.: US 8,909,447 B2
(45) Date of Patent: Dec. 9, 2014

(54) METHOD FOR CONTROLLING SHIFTS IN A VEHICLE TRANSMISSION

(75) Inventors: Florian Schneider, Lindenberg (DE); Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 135 days.

(21) Appl. No.: 13/825,667

(22) PCT Filed: Aug. 3, 2011

(86) PCT No.: PCT/EP2011/063345
§ 371 (c)(1),
(2), (4) Date: Mar. 22, 2013

(87) PCT Pub. No.: WO2012/038137
PCT Pub. Date: Mar. 29, 2012

(65) Prior Publication Data
US 2013/0197769 A1    Aug. 1, 2013

(30) Foreign Application Priority Data

Sep. 24, 2010 (DE) .......................... 10 2010 041 322

(51) Int. Cl.
*B60W 10/02* (2006.01)
*B60W 10/06* (2006.01)
(Continued)

(52) U.S. Cl.
CPC ........... *B60W 10/02* (2013.01); *F16H 61/0403* (2013.01); *F16H 61/688* (2013.01); *F16H 61/702* (2013.01); *B60W 10/06* (2013.01); *B60W 10/10* (2013.01); *F16H 37/043* (2013.01); *F16H 2061/0418* (2013.01)
USPC ............... 701/68; 477/77; 477/166; 477/171; 477/176; 477/177

(58) Field of Classification Search
CPC ..... B60W 10/02; B60W 10/06; B60W 10/10; F16H 37/043; F16H 61/0403; F16H 61/688; F16H 2061/0418; F16H 61/702
USPC ................................................ 701/68; 477/77
See application file for complete search history.

(56) References Cited

U.S. PATENT DOCUMENTS 4,966,048 A    10/1990    Braun
6,105,743 A *   8/2000    Salecker et al. ............. 192/84.6
(Continued)

FOREIGN PATENT DOCUMENTS

DE          103 08 517 A1    9/2004
DE      10 2004 039 273 A1    2/2006
(Continued)

OTHER PUBLICATIONS

German Search Report Corresponding to DE 10 2010 041 322.4.
(Continued)

Primary Examiner — Mary Cheung
Assistant Examiner — Atul Trivedi
(74) Attorney, Agent, or Firm — Davis & Bujold, PLLC; Michael J. Bujold (57) ABSTRACT

A method of controlling shifts in a vehicle transmission, for example a utility vehicle, having a transmission or partial transmission designed as a dual-clutch transmission that shifts as a without traction force interruption. The transmission comprises a dual clutch having a first clutch and a second clutch that are functionally connected to a drive engine, and a transmission or partial transmission comprises a main transmission that shifts with traction force interruption and is connected to a drive-train downstream from the dual-clutch transmission. During shifts in the main transmission that is connected downstream from the dual-clutch transmission, the dual clutch is operated, by pre-loading the two clutches, as a transmission brake and/or an engine brake for adapting the speed of components to be shifted so as to enable short shifting times and ensure comfortable and reliable driving operation.

30 Claims, 8 Drawing Sheets (51) Int. Cl.
  *B60W 10/10* (2012.01)
  *F16H 61/04* (2006.01)
  *F16H 37/04* (2006.01)
  *F16H 61/688* (2006.01)
  *F16H 61/70* (2006.01)

(56) References Cited

U.S. PATENT DOCUMENTS

| | | | |
|---|---|---|---|
| 6,202,776 B1* | 3/2001 | Masberg et al. | 180/65.22 |
| 6,634,247 B2* | 10/2003 | Pels et al. | 74/329 |
| 7,054,732 B2* | 5/2006 | Rieger et al. | 701/67 |
| 7,749,132 B2* | 7/2010 | Motosugi et al. | 477/5 |
| 8,271,171 B2 | 9/2012 | Terwart et al. | |
| 2002/0134637 A1* | 9/2002 | Salecker et al. | 192/54.1 |
| 2002/0177504 A1* | 11/2002 | Pels et al. | 477/3 |
| 2005/0101432 A1* | 5/2005 | Pels et al. | 477/5 |
| 2007/0049460 A1* | 3/2007 | Kolev | 477/180 |
| 2007/0275823 A1* | 11/2007 | Motosugi et al. | 477/176 |
| 2008/0134834 A1 | 6/2008 | Gitt et al. | |
| 2009/0118936 A1* | 5/2009 | Heap et al. | 701/54 |
| 2011/0030488 A1 | 2/2011 | Gumpoltsberger et al. | |

FOREIGN PATENT DOCUMENTS

| | | |
|---|---|---|
| DE | 10 2005 033 027 A1 | 1/2007 |
| DE | 10 2006 054 281 A1 | 6/2008 |
| DE | 10 2007 048 268 A1 | 4/2009 |
| DE | 10 2009 004 709 A1 | 7/2009 |
| DE | 10 2008 008 496 A1 | 8/2009 |
| DE | 10 2008 001 200 A1 | 10/2009 |
| DE | 10 2008 043 384 A1 | 5/2010 |
| EP | 1 624 232 A1 | 2/2006 |
| WO | 2004/076225 A1 | 9/2004 |
| WO | 2009/047162 A1 | 4/2009 |
| WO | 2009/127473 A1 | 10/2009 |

OTHER PUBLICATIONS

German Search Report Corresponding to DE 10 2010 041 303.8.
International Search Report Corresponding to PCT/EP2011/063345.
International Search Report Corresponding to PCT/EP2011/063344.
Written Opinion Corresponding to PCT/EP2011/063345.
Written Opinion Corresponding to PCT/EP2011/063344.

* cited by examiner

| Shift | Load-transmitting clutch before the shift | Load-transmitting clutch after the shift | Clutch engaged during the speed adaptation | Time point when the load-transmitting clutch changes over |
|---|---|---|---|---|
| normal (both clutches free from torque at the start of speed adaptation) | K1 | K2 | K1 | before/at the start of load reduction |
| normal | K1 | K2 | K2 | during speed adaptation |
| closed (at the start of speed adaptation one clutch closed or partially closed) | K1 | K2 | K1 | before/at the start of load build-up |
| closed | K1 | K2 | K2 | during speed adaptation |
| normal | K1 | K1 | K1 | |
| normal | K1 | K1 | K2 | temporarily during speed adaptation |
| closed | K1 | K1 | K1 | |
| normal | K2 | K1 | K2 | before/at the start of load build-up |
| normal | K2 | K1 | K1 | during speed adaptation |
| closed | K2 | K1 | K1 | during speed adaptation |
| normal | K2 | K2 | K2 | |
| normal | K2 | K2 | 1 | temporarily during speed adaptation |
| closed | K2 | K2 | K2 | |
| closed | K2 | K2 | K1 | temporarily during speed adaptation |

Fig. 8

METHOD FOR CONTROLLING SHIFTS IN A VEHICLE TRANSMISSION

This application is a National Stage completion of PCT/EP2011/063345 filed Aug. 3, 2011, which claims priority from German patent application serial no. 10 2010 041 322.4 filed Sep. 24, 2010.

FIELD OF THE INVENTION

The invention concerns a method for controlling shifts in a vehicle transmission.

BACKGROUND OF THE INVENTION

For reasons of comfort and performance, powershift transmissions are increasingly used in utility vehicles. For this, dual clutch transmissions that can be shifted with no traction force interruption are particularly attractive. Transmission structures of dual-clutch transmissions for utility vehicles are known for example from DE 10 2005 033 027 A1 and DE 10 2006 054 281 A1. A method for controlling shift processes in a dual-clutch transmission is described for example in DE 10 2004 039 273 A1.

Such automated shift transmissions comprise an intermediate transmission or a number of intermediate transmission groups connected one after another, and if necessary also a downstream planetary transmission. The gears are divided into two groups, each group being associated with one clutch of the dual clutch system, by virtue of which a sequential shift sequence almost free from traction force interruptions can be carried out. In a conventional manner the force flow of the gears can pass via a drive input shaft and a drive output shaft, or it can meander through the transmission by way of repeatedly changing shafts. Compared with pure powershift automatic transmissions of planetary design, automated shift transmissions have efficiency and cost advantages. However, as the number of gears increases, so also do the overall size, the structural complexity and thus also the production costs.

Since as a rule, depending on their field of use, to obtain a particular transmission spread utility vehicle transmissions need a relatively large number of gears for efficient operation, it is expedient also to consider mixed forms, so-termed partial dual-clutch transmissions, in which, besides a powershift transmission or partial transmission with a dual clutch, there is provided a conventional transmission section, i.e. one that is shifted with traction force interruption, or a downstream transmission that shifts with traction force interruption.

In addition, partial dual-clutch transmissions can advantageously be combined by way of a transfer box or axle transmission with long gear ratios on the rear axle of utility vehicles, which enable fuel-saving and low-emission operation of the drive engine at relatively low rotation speeds. However, owing to the rather low torque reserve in such an operating range this tends to lead to a further increase of the in any case high shifting frequency in utility vehicle transmissions and hence also to a larger number of shift processes with traction force interruption in the conventional part of the transmission.

Upshift processes with traction force interruption are fundamentally always problematic since, to reduce the torque losses, the aim in modern internal combustion engines is to have speed reversion or speed reduction gradients which are as flat at possible. In upshift processes this leads either to more intensive slipping operation at the two clutches of the dual clutch, which translates into higher clutch wear particularly when shift processes are frequent as they are in utility vehicles, or to longer shifting times and hence to longer, unfavorable traction force interruptions since the synchronizing of the clutch in each case takes a longer time.

To accelerate the speed reversion of the internal combustion engine, although an existing engine brake of the utility vehicle can be activated during the shifts, this interferes with driving comfort because of clearly perceptible engagement and disengagement times and operating noise and also results in premature wear because of the large number of shift cycles. Thus, speeding up the speed adaptation during shift processes in the conventional transmission section of partial dual-clutch transmissions by means of the engine brake is rather problematic.

Synchronization, i.e. the speed adaptation of the components to be shifted during a shift process, can also be assisted by an existing transmission brake. In the case of unsynchronized claw-type shifting elements the synchronizing in upshifts can be done completely by means of the transmission brake. However, such an additional brake needs to be designed in accordance with its required power and shifting frequency, and can therefore occupy a relatively large amount of structural space and be correspondingly costly. Thus, speeding up the speed adaptation during shift processes in the conventional transmission section of the partial dual-clutch transmissions exclusively by means of a transmission brake is not optimal.

SUMMARY OF THE INVENTION

Against this background the purpose of the present invention is to indicate a method for controlling shift processes in a transmission section of a partial dual-clutch transmission or in a transmission downstream from the dual-clutch transmission in a vehicle, wherein shifts take place with traction force interruption, which enables short shifting times and yet ensures comfortable and reliable driving operation.

The invention is based on the recognition that in transmissions consisting of a dual-clutch transmission and a downstream conventional transmission section, during the necessary speed adaptation in a shift of the conventional transmission section the time taken for synchronization or speed adaptation of the components to be shifted can be made shorter by actuating or operating the two clutches of the dual clutch transiently in the closing direction.

Accordingly, in particular during an upshift process in the conventional transmission section, the two clutches are preloaded relative to one another so that a resultant braking torque is produced on the drive engine and on the coupled transmission input of the conventional transmission section or the transmission output of the dual-clutch transmission section. During this the braking has no interfering effect on driving operation since during the shift in the conventional transmission section, between disengaging the original gear and engaging the next gear the transmission is shifted to neutral and the force flow in the drive-train to the driven vehicle wheels is interrupted. This necessary interruption is made significantly shorter by the accelerated speed adaptation.

Thus, the invention starts with a method for controlling shifts in the transmission of a vehicle, for example a utility vehicle, with a transmission or partial transmission designed as a dual-clutch transmission that shifts without traction force interruption, comprising a dual clutch with a first clutch and a second clutch which can be functionally connected to a drive engine, and with a transmission or partial transmission designed as a main transmission connected downstream from the said dual-clutch transmission in a drive-train, the said main transmission shifting with traction force interruption. To achieve the stated objective the invention provides that by pre-loading the two clutches during shifts of the main transmission downstream from the dual-clutch transmission, the dual clutch is operated as a transmission brake and/or engine brake for adapting the speed of the components to be shifted.

The method can be applied advantageously both with arrangements comprising a transmission with a dual-clutch transmission section on the engine side and a downstream, conventional transmission section, i.e. one which shifts with traction force interruption, and also with arrangements comprising a complete dual-clutch transmission and a downstream conventional transmission, for example a transfer box or axle transmission. Each clutch of the dual-clutch transmission or dual-clutch transmission section is associated with a respective one-gear or multi-gear dual-clutch transmission branch.

In what follows, the term "dual-clutch transmission" is understood to mean both a complete transmission and also a transmission section. A "main transmission" is understood to mean a transmission or transmission section which follows after the dual-clutch transmission or dual-clutch transmission section in the force flow, and whose design corresponds to a classical variable-speed transmission, which can be constructed as unsynchronized with claw shifting elements or as synchronized with synchronizing shifting packets.

By virtue of the method according to the invention, the disadvantages of traction force interruption in a conventional transmission section can largely be reduced by using the properties of a dual clutch, so that a utility vehicle transmission with a relatively large number of gears can be made as a partial dual-clutch transmission that to a large extent has the comfort advantages of a powershift transmission but which is nevertheless compactly built and less costly. Furthermore, if a transmission brake is present it can be designed for lower loads and can thus be smaller and less costly, since the function of a transmission brake with a very high braking torque and higher power can be obtained by pre-loading the dual clutch.

It is appropriate, in the method, to distinguish between a first shifting sequence in which at the beginning of the speed adaptation the two clutches are both at least largely free from torque, and a second shifting sequence in which at the beginning of the speed adaptation one of the two clutches is free from torque and the other of the two clutches is closed and is therefore transmitting a torque. The function of the dual clutch as a transmission brake is as a rule only needed for upshifts, since during these the engine speed and transmission input speed after the shift is lower than before.

During the speed adaptation, preferably one of the two clutches is closed and the other of the two clutches is operated with slip. In that case the clutch which should be closed, having regard to relevant gear ratio considerations, is or remains closed at least far enough to be able to transmit a certain pre-load torque without slipping. In contrast, the clutch to be operated with slip, having regard to relevant gear ratio considerations, is closed only far enough for a certain pre-load torque still to be transmitted to the closed clutch without causing the latter to slip.

Basically, it is possible for both clutches to be slipping during the speed adaptation, while in the conventional transmission section no gear is engaged. However, it is relatively difficult to achieve simultaneous, accurate control of both clutch torques during slipping operation.

The first slipping sequence is a normal shift in which there is no permanent coupling of the drive engine to the transmission input. During this the engine torque is reduced by action upon the transmission control system, and the currently load-transmitting clutch is opened or controlled so as to be free from torque. As soon as the drive-train is free from torque the gear is disengaged, and both clutches are open or nearly open or at least torque-free. The speed of the transmission input must now be slowed until the shift partners, for example claws, are rotating synchronously for the new gear in the main transmission. For this, according to the invention and in accordance with certain criteria one of the two clutches is closed and the other operated permanently with slip, whereby the transmission input and consequently the drive engine are braked. During this the torque at the clutches is adjusted so that at first the engine and the transmission input are slowed down to a target speed. Thereafter that speed is maintained for the shift process, in that preferably the slipping clutch or both clutches are again opened or made torque-free and the clutch pre-loading is thus reduced or eliminated.

If necessary an engine control system can regulate the speed. During the braking it is advantageous, by acting on the engine control system, to switch off the fuel injection in order to ensure that the engine is not working in opposition to the dual clutch functioning as a transmission brake. As soon as the synchronous speed is reached, the new gear is engaged, the load-transmitting clutch is closed and the other clutch fully opened if this has not yet taken place. Typically, the load build-up in the drive-train begins with an engine torque that corresponds exactly to the previous pre-load torque of the clutches and increases in step with the decrease of the pre-load torque.

The second shifting sequence is a shift with clutch closed or partially closed during the load reduction, the transmission shift and the load build-up. In this case the engine torque is reduced and at least one of the two clutches is and remains fully or partially closed. The gear is disengaged as soon as the drive-train is sufficiently free from torque, whereas at least one clutch is transmitting torque. The transmission input, together with the drive engine, must now have their speeds slowed down until the shift partners, for example claws, are rotating synchronously for the new gear in the main transmission. For this, according to the invention, the second clutch as well is at least partially closed so that one clutch is operating permanently with slip and braking torque is built up, while the other clutch is closed, i.e. it is locked by friction. The subsequent shifting sequence corresponds to the normal shifting sequence.

The aim of the method, for carrying out a shift in the main transmission, is to control the pre-loading of the dual clutch in such manner that with a suitable combination of a slipping and a closed clutch, if necessary by selecting a gear in an associated dual-clutch transmission branch, the duration of the speed adaptation is minimized so that the aspects of comfort and wear are taken into account.

For this it is advantageous, for each shift process in the main transmission, to determine the faster-running and the slower-running of the two clutches if at least one dual-clutch transmission branch of the dual-clutch transmission has more than one gear. Otherwise, the faster- and slower-running of the two clutches can be stored in advance in a control unit.

Since in accordance with their gears the two dual-clutch transmission branches can have different gear ratios, the two input shafts of the transmission branches and hence the clutches rotate at different speeds when the drive output shaft of the dual-clutch transmission is rotating. Thus, when the dual clutch is pre-loaded at least one of the two clutches must be operated with slip whereas the other clutch can be closed. The clutch associated with that transmission branch whose gear ratio is the higher of the two, is called the faster clutch in accordance with its higher speed. When one or both dual-clutch transmission branches have more than one gear, i.e. they are variable-speed transmissions in their own right, it is accordingly possible, depending on the gears engaged in the transmission branches, to change over the faster and slower clutches. On the other hand, if each of the two transmission branches has a fixed gear ratio, the faster-running and slower-running clutches remain respectively the same.

Furthermore, the shifts can also be categorized. For this, preferably the following criteria are used, which can be taken into account for selecting a particular sequence for the speed adaptation:

a) Gearshift in the dual-clutch transmission and in the main transmission with change of the load-transmitting clutch, or gearshift in the main transmission alone, the load-transmitting clutch being understood to be that clutch which, outside of a shift process, is closed i.e. torque-transmitting. The load-transmitting clutch can be identical before and after a shifting operation, or it can change.

b) Change-over of the clutches from the faster to the slower clutch or vice-versa.

c) Degree of closing of the first clutch and the second clutch. By virtue of the respective closing degrees of the clutches, when the dual clutch is used as a transmission brake for speed adaptation it is possible to predetermine or influence which of the two clutches, when the dual clutch is pre-loaded, operates closed and which operates with slip.

The choice of which clutch operates closed and which with slip, is decisive for the transmission brake function of the dual clutch. In particular, it determines:

how much braking torque can be exerted on the drive engine, since this depends on the gear ratios of the gears engaged in the dual-clutch transmission branches, how large a speed difference at the drive engine has to be overcome until synchronous speed is achieved in the main transmission for engaging the target gear, how much frictional work must additionally be performed in the slipping clutch, which and how many actuator movements are needed for the shift process, and consequently, what shifting time can ultimately be achieved.

The dual clutch is advantageously controlled as a function of various target criteria, such as performance or power, comfort and wear.

In particular, for performance-orientated shifts it can be provided that the clutch which should be operated with slip and the clutch which should be operated closed are chosen such that the shortest possible time is obtained for the speed adaptation. For that purpose a calculation or estimate of the duration of the two variants can be carried out, and that one is then selected which enables the shortest shift time until gear engagement.

If, in the shift process concerned, the same clutch of a dual-clutch transmission branch is load-transmitting both before and after the shift, then in addition, in the other currently unused dual-clutch transmission branch, if this transmission branch has more than one gear, a gear can be selected in such manner that the time for speed adaptation is as short as possible. For that purpose a calculation or estimate of the time duration for each of the possible gears can be carried out and that gear can be chosen which enables the shortest shift time until gear engagement.

In a comparative mathematical consideration of the torque ratios and speed ratios having regard to the gear ratios and mass moments of inertia in a transmission system consisting of a dual-clutch transmission section and a downstream conventional transmission section, it emerges surprisingly that owing to conflicting influences it is not possible to determine in a simple way which of the two clutches, when pre-loading the dual clutch for the purpose of achieving the quickest possible speed adaptation in a main transmission with traction force interruption, should advantageously be operated closed or with slip during the braking process. Rather, the time duration must be estimated in each case and the closed clutch is then determined from the result.

The clutches for slipping and closed operation and the available gears in the currently unused dual-clutch transmission branch can advantageously be selected in such manner that first, the time required for speed adaptation with each combination of clutch and gear is determined, and then the combination that gives the shortest time is selected. A time estimate or calculation for speed adaptation can be carried out with reference to predetermined or measured parameters or ones calculated by means of algorithms, or from relevant magnitudes derived therefrom. As essential influencing factors on the shift time that can be achieved, besides the gear ratios in the dual-clutch transmission, the gearshift-determined speed reduction in the dual-clutch transmission and the change of the drive output speed in the dual-clutch transmission, the maximum torques that can be transmitted by the two clutches, an effective operative mass moment of inertia, as well as the engine speed difference to be reduced and the braking torque produced at the drive engine are taken into account.

The time required for speed adaptation by means of pre-loading the dual clutch with a closed and a slipping clutch, including a gearshift in the dual-clutch transmission and until synchronization of the components to be shifted, when a target gear in the main transmission can be engaged, can be derived from the general equation of movement $M=J(d\omega/dt)$ for a rotating system, in which M is the resultant torque, J is the moment of inertia and w is the angular velocity. For simplicity, by definition the faster clutch in each case is denoted as K1 and the slower clutch as K2, and their indexes are used correspondingly.

Accordingly, when one of the clutches K1 is closed during the speed adaptation, the synchronization time is obtained from the equation:

$$\Delta t\_1 = \Delta\omega\_M1 / tq\_M1 \cdot J\_M\_Red\_1,$$

with a braking torque tq_M1 at the drive engine, of:

$$tq\_M1 = -|tq\_K2| \cdot (1 - i\_2/i\_1),$$

with a clutch torque tq_K2, a gear ratio i_1 and a gear ratio i_2 of the two dual-clutch transmission branches, and with a total mass moment of inertia reduced at the engine level, of:

$$J\_M\_Red\_1 = J\_M + J\_M\_Red\_ab\_1 + J\_M\_Red\_K2$$
$$= J\_M + J\_ab/i^2\_1 + (J\_K2 \cdot i^2\_2)/i^2\_1,$$

this equation containing a mass moment of inertia J_M of the drive engine, a mass moment of inertia J_ab at the drive output, a mass moment of inertia J_K2 of the clutch K2, a mass moment of inertia of the drive output J_M_Red_ab_1 related to the engine level, a mass moment of inertia J_M_Red_K2 of the clutch K2 related to the engine level, as well as a speed difference Δn_M11 at the drive engine for the shift when the clutch K1 was load-transmitting, given by the equation:

$$\Delta n\_M11 = \Delta n\_M12 \cdot (\Delta\omega\_M1/\Delta\omega\_M2) = n\_ab\_1 \cdot i\_1 - n\_ab\_0 \cdot i\_1$$

with a drive output speed n_ab_1 at the dual-clutch transmission after the shift and with a drive output speed n_ab_0 at the dual-clutch transmission before the shift, and a speed difference Δn_M21 at the drive engine for the shift when the clutch K2 was load-transmitting, given by the equation:

$$\Delta n\_M21 = \Delta n\_M22 \cdot (\Delta\omega\_M1/\Delta\omega\_M2) = n\_ab\_1 \cdot i\_1 - n\_ab\_0 \cdot i\_2.$$

Analogously, when the other clutch K2 is closed during the speed adaptation, the synchronization time is obtained from the equation:

$$\Delta t\_2 = \Delta\omega\_m2/tq\_M2 \cdot J\_M\_Red\_2,$$

with a braking torque tq_M2 on the drive engine, of:

$$tq\_M2 = -|tq\_K1| \cdot (1 - i\_1/i\_2),$$

with a clutch torque tq_K1, a gear ratio i_1 and a gear ratio i_2 of the two dual-clutch transmission branches, and with a total mass moment of inertia reduced at the engine level, of:

$$J\_M\_Red\_2 = J\_M + J\_M\_Red\_ab\_2 + J\_M\_Red\_K1$$
$$= J\_M + J\_ab/i^2\_2 + (J\_K1 \cdot i^2\_1)/i^2\_2,$$

with a mass moment of inertia J_M of the drive engine, a mass moment of inertia J_ab at the drive output, a mass moment of inertia J_K1 of the clutch K1, a mass moment of inertia J_M_Red_ab_2 of the drive output related to the engine level and with a mass moment of inertia J_M_Red_K1 of the clutch K1 related to the engine level, and a speed difference Δn_M22 at the drive engine for the shift when the clutch K2 was load-transmitting, given by the equation:

$$\Delta n\_M22 = \Delta n\_M21 \cdot (\Delta\omega\_M2/\Delta\omega\_M1) = n\_ab\_1 \cdot i\_2 - n\_ab\_0 \cdot i\_2,$$

with a drive output speed n_ab_1 at the dual-clutch transmission after the shift with a drive output speed n_ab_0 at the dual-clutch transmission before the shift, and a speed difference Δn_M12 at the drive engine for the shift when the clutch K2 was load-transmitting, given by the equation:

$$\Delta n\_M12 = \Delta n\_M11 \cdot (\Delta\omega\_M2/\Delta\omega\_M1) = n\_ab\_1 \cdot i\_2 - n\_ab\_0 \cdot i\_1.$$

In determining the effective mass moment of inertia it can also be advantageous to take into account any existing auxiliary drive output components that can be coupled or decoupled as necessary, in accordance with their operating condition, and current wear conditions of the two clutches.

In determining the engine speed difference at the drive engine which is to be reduced, a predicted change of the vehicle's speed can also be taken into account.

Furthermore, the determination of the engine speed difference can if applicable involve a speed change of the drive engine caused by a time delay due to a gearshift in the free dual-clutch transmission branch. This time delay itself must then be taken into account when determining the time required for the speed adaptation. This situation can occur if, approximately at the same time as the initiation of the shift in the main transmission, the gear in the currently free dual-clutch transmission branch also changes and the shift process in the dual-clutch transmission takes a longer time than the shift process in the main transmission.

In determining the engine braking torque maximum clutch torques which cannot or must not be exceeded, or to exceed which would take a disproportionately long time, are taken into account.

Furthermore, when determining the engine braking torque it is preferable to assume an average clutch torque of the slipping clutch. This makes it possible to allow for the fact that the said clutch does not transmit, from the very beginning of its actuation, a final torque intended as the transmission brake, since the said torque first has to be built up. The average clutch torque can for example be defined by weighting the final torque. It is reasonable that the value will be the closer to the final torque, the larger is the speed difference to be overcome for the speed adaptation, since with large speed differences the speed adaptation takes more time, so the torque build-up phase becomes less significant.

Moreover, it can be provided that a gearshift in the currently unused dual-clutch transmission branch is carried out predictively, i.e. in advance, if the load-transmitting clutch remains unchanged by the next shift to be expected. In this way the usual procedure with dual-clutch transmissions, that of already preselecting a gear just in the unused transmission branch, can be used so as to avoid any unnecessary delay during the speed adaptation due to the shift process in the dual-clutch transmission branch. This can always be done if a suitable gear is determined for the speed adaptation in the free dual-clutch transmission branch and when there is no change of the load-transmitting clutch for the actual shift process in the main transmission.

In comfort-orientated shifts good shifting comfort is given priority compared with a short shift duration. For this, if possible no disturbances caused by clutch actuations should occur or be perceptible. That is the case when, during the gear engagement, no slip has to be eliminated at the clutch which is load-transmitting after the shift because the clutch is already running synchronously. When the dual clutch is operated as a transmission brake this is always so when the clutch which is closed during the shift is also the one which will be load-transmitting after the shift, so that the load build-up can begin immediately after the gear engagement. Thus, for comfort-orientated shifts it is advantageously provided that during the speed adaptation that clutch is brought to the closed condition which will be the load-transmitting clutch after the shift.

Furthermore, measures for protecting the dual clutch can be provided. The braking of the drive engine and transmission input by pre-loading the dual clutch has the consequence that friction work is performed in whichever clutch is slipping. Accordingly it can be provided that the clutch selected as the slipping clutch in each case is only operated as a transmission brake when, at a determined current load, a previously determined load reserve of the clutch permits this, whereas otherwise the other of the two clutches is operated as the slipping clutch, or any actuation of the dual clutch as a transmission or engine brake is abandoned.

The load reserve is chosen such that in no case is a critical load limit exceeded. In this way the dual clutch can be protected reliably against premature wear. In determining the load reserve it is possible to take into account shortly to be expected subsequent shift processes of the clutch, for example load-intensive starting processes, and a respective driver's wish indicated by a corresponding accelerator pedal actuation. Moreover, current ambient conditions such as road inclination and the driving resistance that incorporates air resistance, rolling resistance, resistance due to road inclination and resistance to acceleration can also be taken into account. Thus, the load limits can vary. Furthermore, the typical use of the vehicle, for example predominantly long-haul driving or off-road driving, can be taken into account.

Since the two clutches can be designed differently, for each clutch individually a load limit test is carried out. For this, additional clutch-specific parameters such as the mass of the clutch, its specific heat capacity, heat conduction, fitting location and consequent cooling behavior are evaluated. Accordingly, the dual clutch is advantageously only operated as a transmission brake and/or an engine brake if a predicted relevant clutch load is lower than a limit value or if a current clutch load increased by a predicted additional friction energy input is lower than a limit value.

To use the transmission brake function of the dual clutch as effectively and efficiently as possible and not unnecessarily dissipate friction energy in the dual clutch, it can also be provided that before implementing the method certain boundary conditions and an attainable, predefined comfort level or performance level are checked.

In particular it can be provided that the dual clutch is operated as a transmission brake and/or engine brake if a rapid shift is deemed necessary and this is indicated by a driver's wish or an active kick-down position of an accelerator pedal, and/or the current driving resistance is comparatively high.

Furthermore, it is expedient to evaluate the speed in such manner that the dual clutch is operated as a transmission brake and/or engine brake if a target speed of the speed adaptation is higher than or equal to an idling speed of the drive engine, since above the idling speed a usually present idling regulator acts against the braking process. This can be avoided in that if the speed falls below the idling speed, the idling regulation is temporarily suppressed by action in an engine control system.

It is also possible for the operation of the dual clutch as a transmission brake and/or engine brake to be terminated when the speed reaches or at most falls slightly below the idling speed. In this case the not actively braked run-down of the engine can suffice for reaching the synchronous speed, or if necessary an existing conventional transmission brake can be used.

BRIEF DESCRIPTION OF THE DRAWINGS

To illustrate the invention the description of a drawing with example embodiments is attached. The drawing shows.

DETAILED DESCRIPTION OF THE PREFERRED EMBODIMENTS

Figure 1:
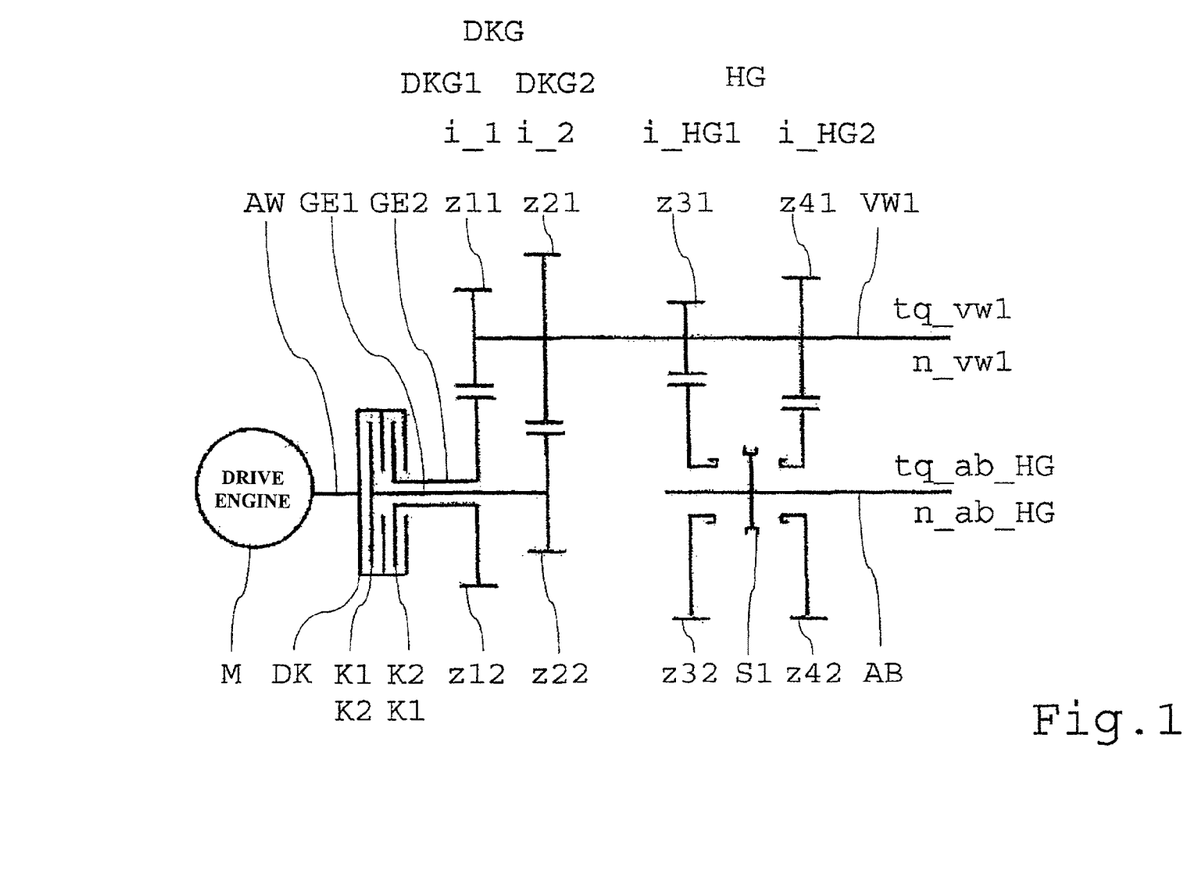
FIG. 1: A schematic representation of a partial dual-clutch transmission for carrying out a method according to the invention.
Figure 2:
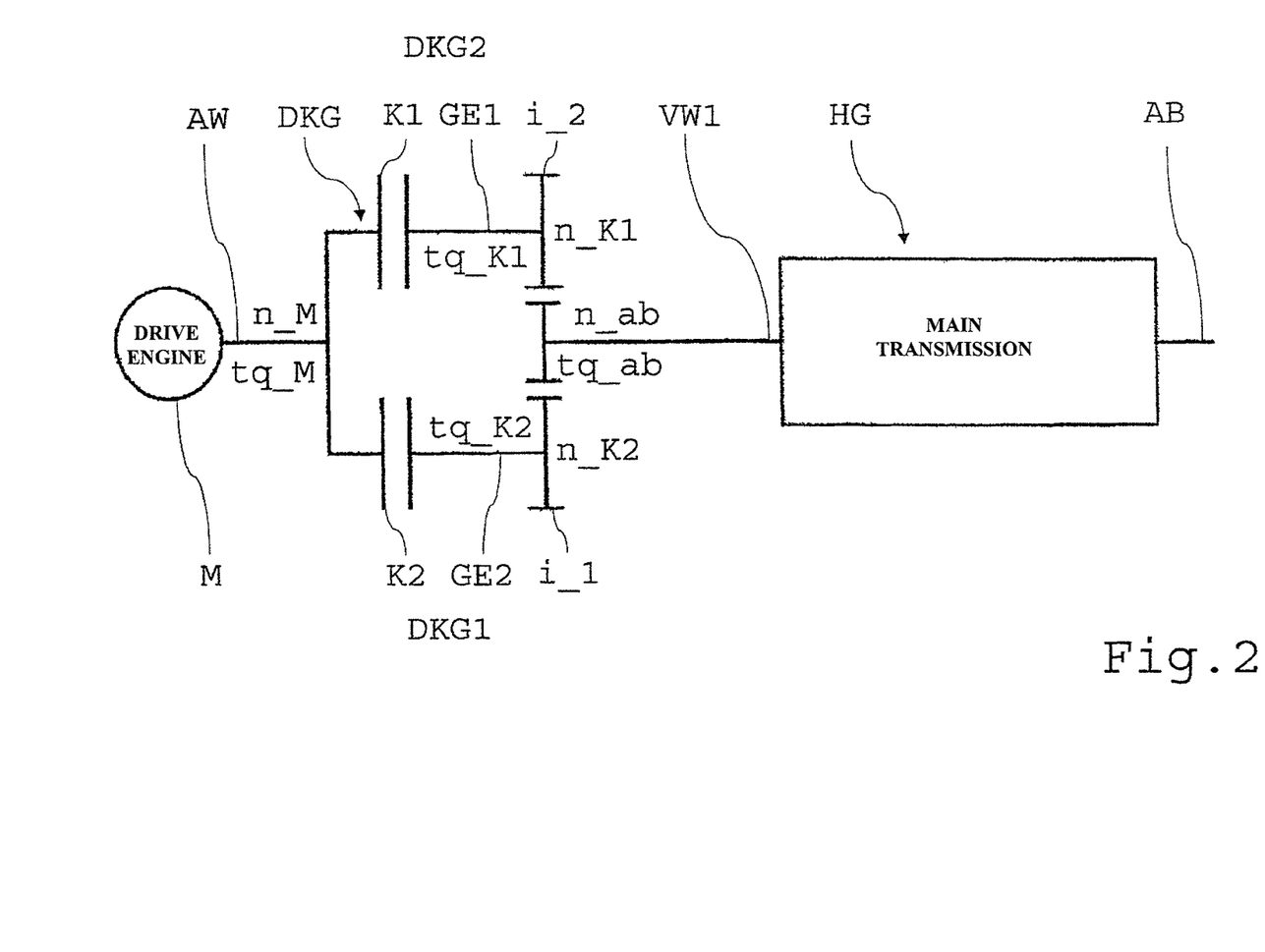
FIG. 2: A diagrammatic equivalent of the partial dual-clutch transmission.

Thus, a partial dual-clutch transmission of countershaft design shown in FIG. 1 comprises a first partial transmission consisting of a powershifting dual-clutch transmission DKG and a second partial transmission in the form of a main transmission HG that shifts with traction force interruption. An associated diagrammatic equivalent is shown in FIG. 2. The dual-clutch transmission DKG comprises a dual clutch DK with a first clutch K1 and a second clutch K2. Since by definition, for a method according to the invention the faster-rotating clutch is denoted K1 and the slower-rotating clutch is denoted K2 and the indexes are used correspondingly, the indexing of the clutches can change. A clutch input side is represented by a common clutch cage, which is connected to a drive input shaft AW of a drive engine M in the form of an internal combustion engine. By way of the drive input shaft AW a drive torque with engine rotation speed n_M can be transmitted.

A first transmission input shaft GE1 is connected fixed at its engine-side end to the first clutch K1 and to its transmission-side end to a gearwheel z22. A clutch torque tq_K1 can be transmitted by the first clutch K1. The clutch output side or gearwheel z22 rotates with a first clutch rotation speed n_K1. The gearwheel z22 meshes with a gearwheel z21 arranged in a rotationally fixed manner on a countershaft VW1. The gearwheel pair z21/z22 constitutes a second input constant i2, which together with the first clutch K1 forms a one-stage second dual-clutch transmission branch DKG2.

A second transmission input shaft GE2 in the form of a shorter, hollow shaft is fitted over the first transmission input shaft GE1. At its engine-side end it is connected fixed to the second clutch K2 and at its transmission-side end to a gearwheel z12. A clutch torque tq_K2 can be transmitted by the second clutch K2. The clutch output side and gearwheel z12 rotate at a second clutch speed n_K2. The gearwheel z12 meshes with a gearwheel z11 arranged rotationally fixed on the countershaft VW1. The gearwheel pair z11/z12 forms a first input constant i1 positioned axially upstream from the second input constant i2, and together with the second clutch K2 forms a one-stage first dual-clutch transmission branch DKG1.

In its mode of action, as regards gear ratio the dual-clutch transmission DKG corresponds to a splitter group for a transmission group positioned after it. During driving operation one dual-clutch transmission branch DKG1 or DKG2 is always load-transmitting or active by virtue of its associated clutch K1 or K2 respectively, while the other branch DKG1 or DKG2 with its other associated clutch K1, K2 is free, or not used for torque transmission. Thus, at the output of the dual-clutch transmission DKG there is a clutch torque and a rotation speed either of the one, or of the other dual-clutch transmission branch DKG1, DKG2. In shift processes with actuation of both clutches K1, K2 a resulting drive output torque tq_ab and a corresponding drive output speed n_ab are obtained.

Connected downstream from the dual-clutch transmission DKG is a two-stage main transmission HG with a first main transmission gear i_HG1 and a second main transmission gear i_HG2. The first main transmission gear i_HG1 comprises a gearwheel z31 arranged in a rotationally fixed manner on the countershaft VW1, which meshes with a gearwheel z32 arranged to rotate on a drive output shaft AB. The second main transmission gear i_HG2 comprises a gearwheel z41, again arranged rotationally fixed on the countershaft VW1, which meshes with a gearwheel z42 arranged to rotate on the drive output shaft AB. The two loose wheels z32, z42 can be alternately connected rotationally fixed to the output shaft AB by means of an unsynchronized shifting element S1 in the form of a claw clutch. The countershaft VW1 is acted upon by a drive input torque tq_vw1 and rotates at a drive input speed n_vw1. At the output of the main transmission HG and therefore of the transmission as a whole, the resultant drive output torque is tq_ab_HG and the drive output speed is n_ab_HG, which act at the driven vehicle wheels or axles.

The partial dual-clutch transmission shown serves only as a simplified transmission structure for illustrating the torques and speeds that are relevant for implementing a method according to the invention as described below. A partial dual-clutch transmission of a real utility vehicle can for example comprise two two-stage dual-clutch transmission branches and a three-gear or four-gear main transmission, so that twelve or sixteen forward gears and at least one reverse gear are available.

Figure 3:
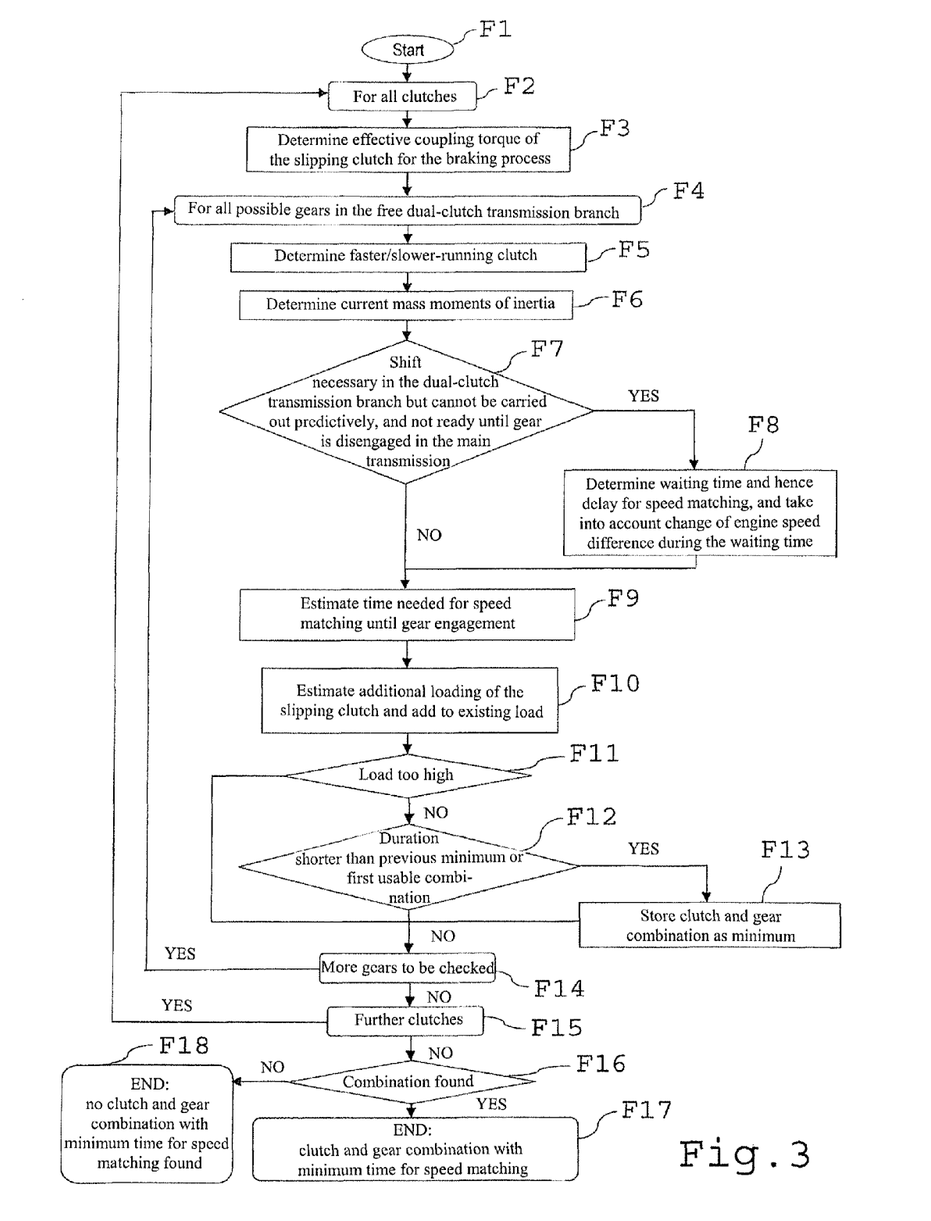
FIG. 3: A flow diagram for carrying out a performance-orientated shift sequence according to the invention.

FIG. 3 shows a sequence according to the invention in function blocks F1 to F18 for shifts with maximum performance, i.e. with shifting time made as short as possible thanks to a rapid speed adaptation by controlling the dual clutch DK during a shift in the main transmission HG. In this case, for an upshift in the main transmission HG an effective clutch torque tq_K for both clutches K1, K2 in slip is first determined for a transmission engine braking function (F1, F2, F3).

Then, for all the possible gears in the free, i.e. currently unused dual-clutch transmission branch, the faster and slower clutches K1, K2 are determined in each case (F4, F5).

In addition, the relative mass moments of inertia J of the rotating masses are determined for the speed adaptation (F5).

If, to speed up the braking, a gearshift is expedient in the dual-clutch transmission DKG but cannot be shifted in advance, for example because the load-transmitting clutch K1, K2 changes or this has not been completed until neutral is engaged in the main transmission HG (F7), then a waiting time with a speed change at the drive engine M is determined (F8). From these data the time duration $\Delta t$ for the speed adaptation is estimated (F9).

For this, the additional load due to friction energy input at the slipping clutch K1, K2 is checked (F10). If the total loading of the clutch K1, K2 is lower than a critical limit value (F11) the combination found, of a slipping or closed clutch K1, K2 and a gear in the dual-clutch transmission DKG (F12), is if necessary stored as a temporary minimum (F13).

This cycle is repeated for all the gears and clutches K1, K2 (F14, F15), and the respective temporary minimum is if necessary repeatedly over-written until the best combination for the desired shift process, i.e. the one that leads to the shortest shifting time $\Delta t$, has been found (F16, F17) and the actuation of the dual clutch DK and of the gearshift in the dual-clutch transmission DKG can be correspondingly initiated. If no appropriate combination with an admissible clutch load is found, the process ends (F18).

Figure 4:
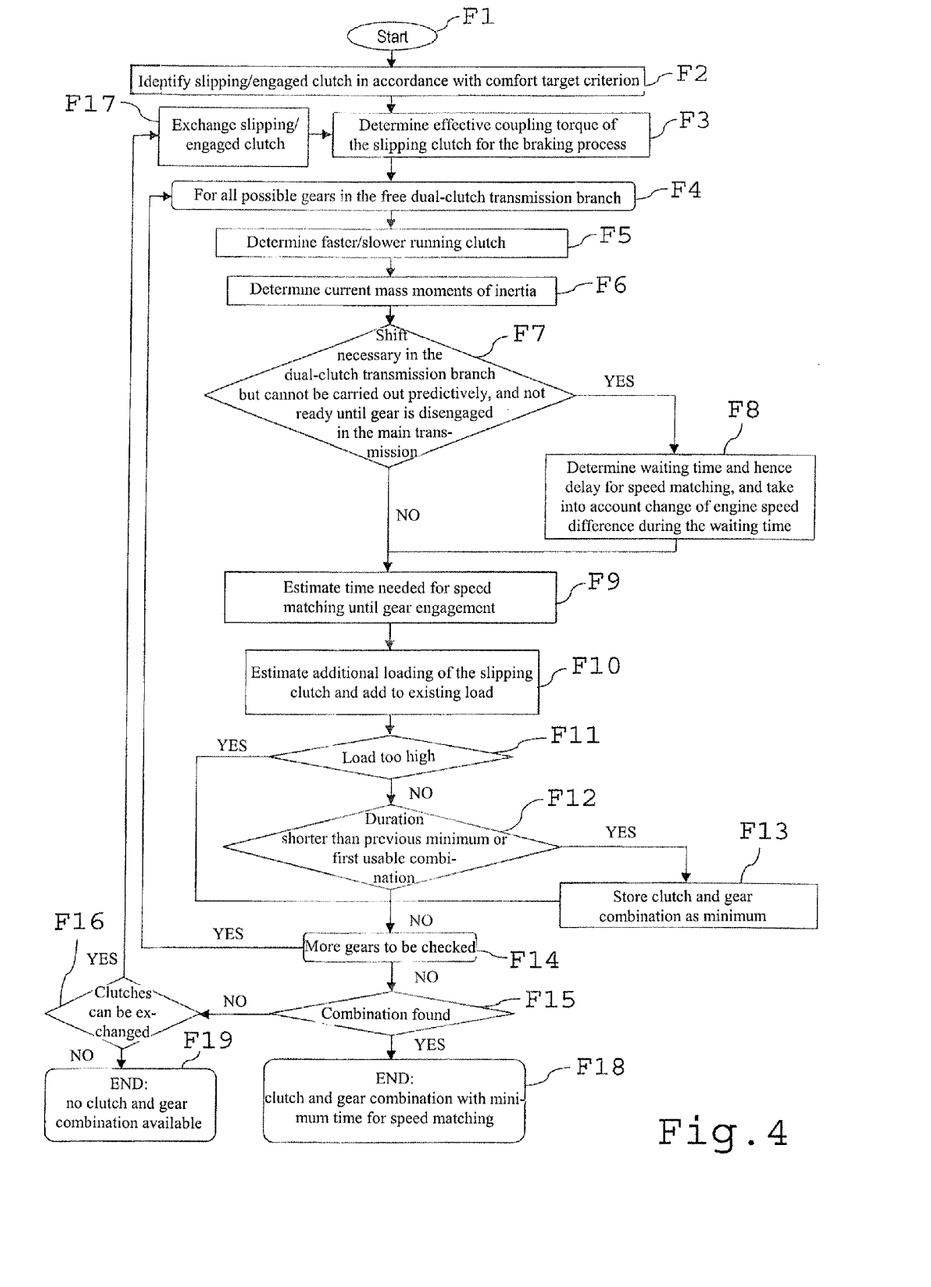
FIG. 4: A flow diagram for carrying out a comfort-orientated shift sequence according to the invention.

FIG. 4 shows a sequence according to the invention in function blocks F1 to F19 for shifts with maximum comfort, i.e. with a shifting time as short as possible thanks to rapid speed adaptation, but having regard to as continuous, shift-jerkiness-free a transition as possible from the original gear to the target gear.

First, the slipping or closed clutch K1, K2 is determined in such manner that whichever clutch K1, K2 will be load-transmitting after the shift is closed during the speed adaptation, whereas the other clutch K1, K2 is controlled for slipping operation (F2). Then, the clutch torque tq_K for the slipping operation is determined (F3).

The subsequent estimation of the duration of the speed adaptation in combination with the gears of the dual-clutch transmission DKG is carried out as in the sequence in FIG. 3 (F4 to F14). As the result, a comfort-orientated clutch-gear combination can be determined (F15, F18).

If no combination with a dual-clutch transmission gear ratio is found, in particular because the predicted clutch loading is too high, a test of changing over the two clutches K1, K2 is carried out (F16), if necessary accepting some loss of comfort. If the exchange is carried out (F17), the cycle is repeated again to determine a favorable combination of the clutch K1, K2 concerned with a suitable gear of the dual-clutch transmission DKG for the speed adaptation, in order still to be able to carry out the process or if necessary terminate it.

Figure 5:
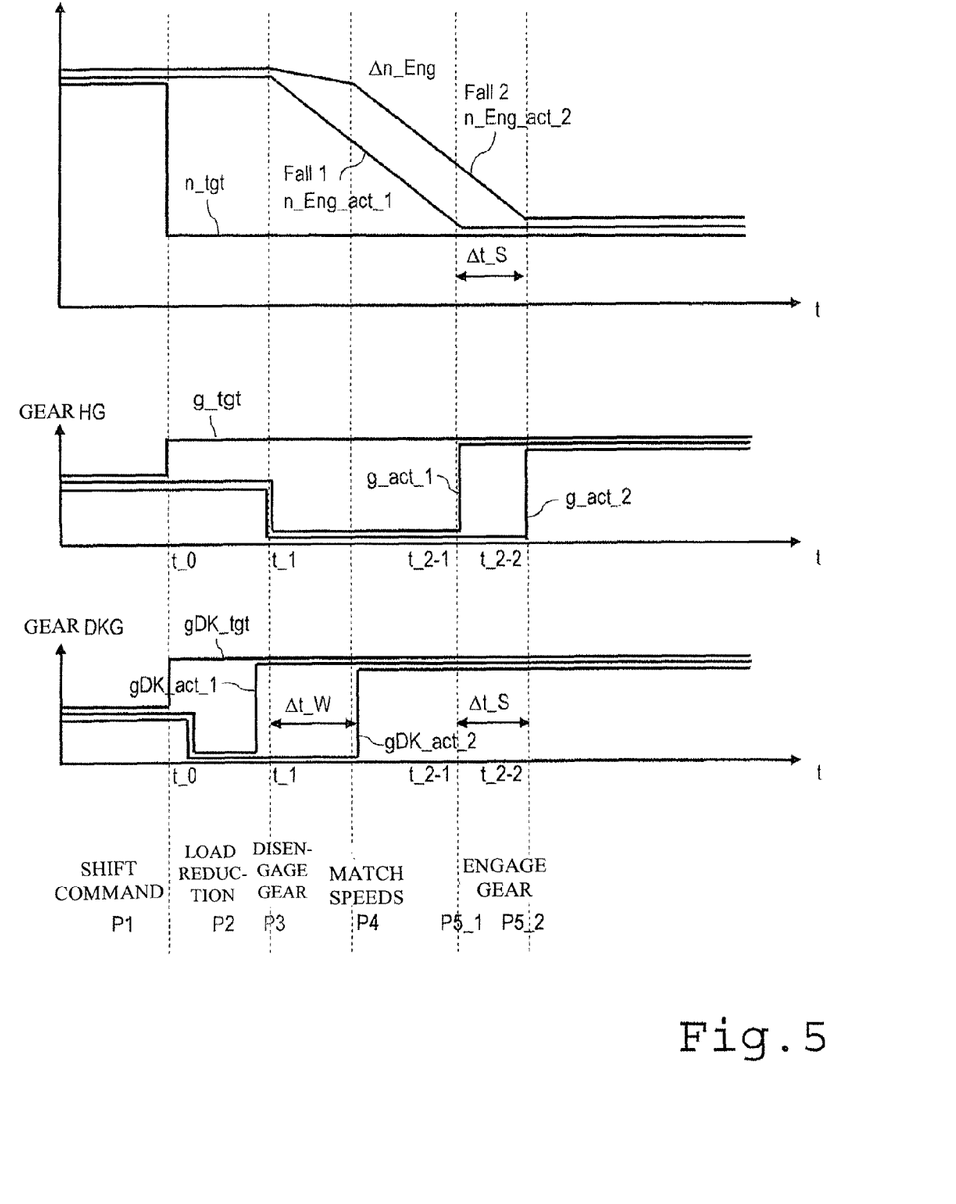
FIG. 5: A speed and gear diagram for carrying out a performance-orientated shift sequence according to the invention, with a gearshift in the partial dual-clutch transmission.

FIG. 5 shows a diagram of a performance-orientated shift sequence according to the invention in which, for the shift-time-shortening speed adaptation with the help of the dual clutch DK during an upshift in the main transmission HG, a gearshift must also be carried out in the dual-clutch transmission DKG. The diagram shows relevant time variations of speeds n(t) and gearshifts in the dual-clutch transmission DKG and in the main transmission HG. The shift sequence is divided into six phases P1 to P6, of which five are explicitly represented in FIG. 5, namely phase P1=shift demand, phase P2=load reduction, phase P3=gear disengagement, phase P4=speed adaptation, phase 5=gear engagement, phase P6=load build-up.

After a shift demand the actuation of the at least one clutch begins at a time point t_0 (P1). The currently load-transmitting clutch K1, K2 (and/or shifting clutch) is actuated in the opening direction, the load reduction (P2) begins and the required target speed n_tgt at the drive engine and the transmission input for a target gear is determined (rotation speed diagram). The target gear g_tgt in the main transmission (gear HG diagram) and the target gear gDK_tgt in the free dual-clutch transmission branch (gear DKG diagram) are preselected, whereby a suitable combination of DKG gear and slipping clutch K1, K2 is determined in accordance with the performance-orientated process cycle (FIG. 3) for the speed adaptation.

Two cases (indexed 1 and 2) are distinguished: in the first case the DKG gear is already predicted or the shift process in the dual-clutch transmission DKG takes place more quickly than the load reduction (P2) in the main transmission HG. When the gear is disengaged in the main gear HG at time t1 (P3) the gearshift from gDK_act_1 to gDK_tgt in the free dual-clutch transmission branch DKG1, DKG2 has already been completed. The active, clutch-controlled speed adaptation begins and the current actual engine speed n_Eng_act_1 falls continuously. At time t_2-1 (P5_1) synchronous rotation is reached. The target gear g_act_1=g_tgt in the main transmission HG is engaged. Neither is the beginning of the speed adaptation process delayed by the shift in the dual-clutch transmission DKG, nor is the shift as a whole made any longer.

In the second case the shift in the currently unused dual-clutch transmission branch DKG1 or DKG2 is initiated at about the same time as the main transmission shift, because no prediction was possible in the dual-clutch transmission. The shift process lasts longer than the load reduction. The beginning of the speed adaptation can only be initiated after a delay $\Delta t\_W$ in a phase P4. During the said delay $\Delta t\_W$ the engine speed n_Eng_act_2 already falls passively owing to internal engine losses and/or by virtue of a transmission brake, if present, which is less effective than the transmission brake function of the dual clutch, by a comparatively small amount $\Delta n\_Eng$. Correspondingly, the synchronization time increases by an amount $\Delta t\_S$ which is somewhat shorter than the waiting time $\Delta t\_W$. The target gear g_act_2=g_tgt can only be engaged at a later point in time t_2-2 (P5_2).

Figure 6:
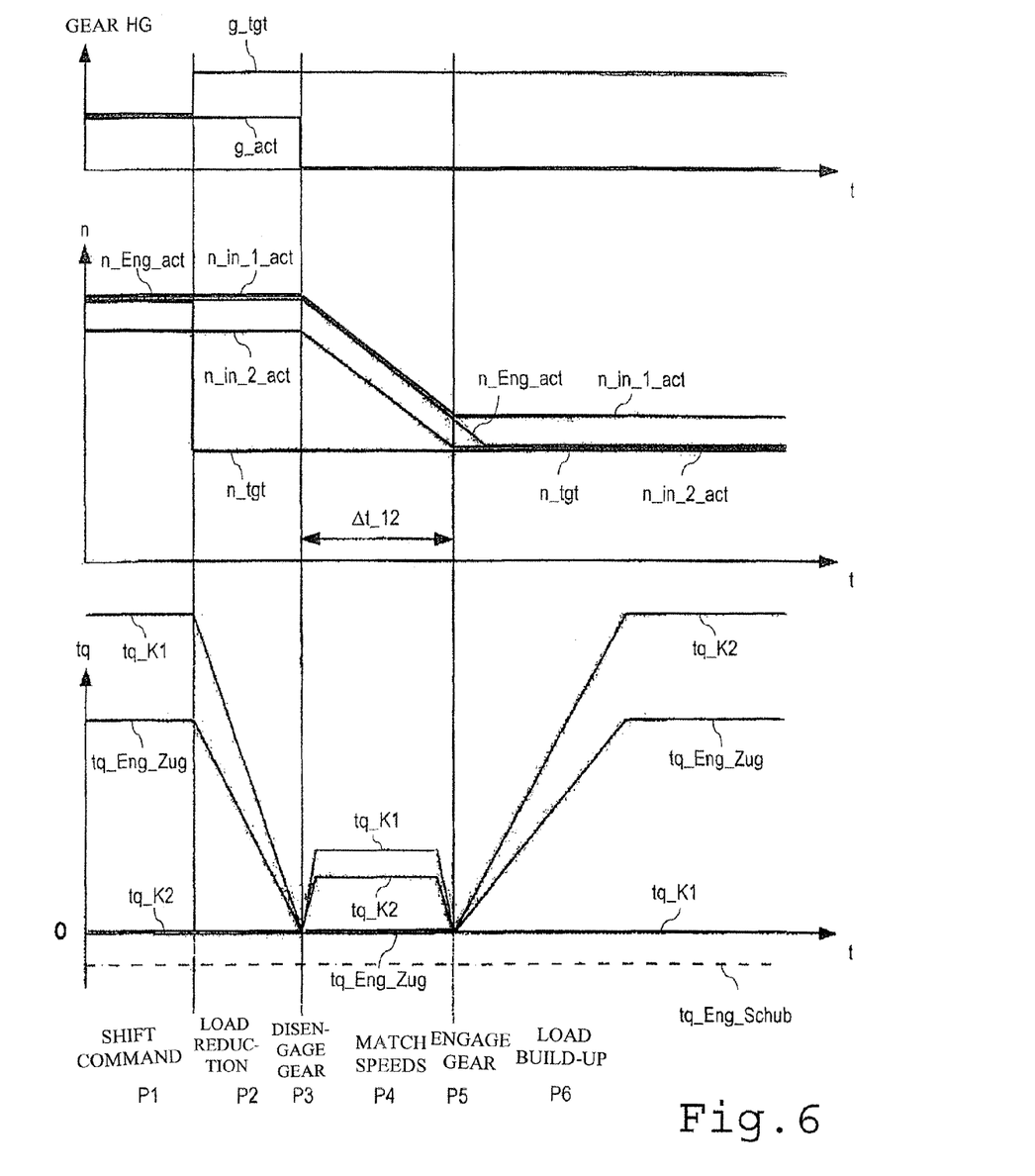
FIG. 6: A gear, speed and torque diagram to explain the carrying out of a shift sequence according to the invention, with initially torque-free clutches.

FIG. 6 shows a normal shift sequence, i.e. a shift sequence in which the drive engine M and a transmission input are not continuously coupled. The shift sequence is divided into six phases P1 to P6. As the sixth phase P6, the load build-up after the shift is shown. The figure shows the gear curves for the target gear g_tgt and the current gear g_act, the variations of the actual transmission input speed n_in_1_act of one clutch K1 and n_in_2_act of the other clutch K2 compared with the target or synchronous speed n_tgt and the actual speed n_Eng_act of the drive engine M, and the torque variations tq_K1, tq_K2 of the clutches K1, K2 and the engine torque tq_Eng_Zug, t_Eng_Schub during a shift in traction operation or in thrust operation respectively.

At the beginning of the speed adaptation (P4) both clutches K1, K2 are torque-free, or open. During the speed adaptation, over a time period Δt_12 the first clutch K1 is closed. Consequently the speed curve of the drive engine n_Eng_act and the speed curve n_in_1_act of the first clutch K1 coincide in this range since their speeds are equal. In contrast the second clutch K2 is slipping, at lower speeds n_in_2_act. Accordingly, the drive engine M and the transmission input are braked.

During the shift the load-transmitting clutch changes over from K1 to K2, and the shift is completed by the gear engagement (P5) and the beginning of load build-up (P6). Thus, at the end of the speed adaptation both clutches K1, K2 are again opened. The previously closed clutch K1 remains open, whereas the previously slipping clutch K2 is now actuated in the closing direction. This can be seen clearly from the two torque curves tq_K1, tq_K2, which show the respective torques that can be transmitted by the clutches K1, K2.

Synchronous rotation for gear engagement (P5) is reached when the speed n_in_2_act of the clutch that will be load-transmitting after the shift, i.e. in this case the second clutch K2, has reached the target speed n_tgt (see the speed diagram in FIG. 6). During a traction shift the curve of the engine or drive torque tq_Eng_Zug falls to zero when the original gear is disengaged (no-load condition) and rises again after the speed adaptation. During a thrust shift there is a constant (negative) thrust torque tq_Eng_Schub.

Figure 7:
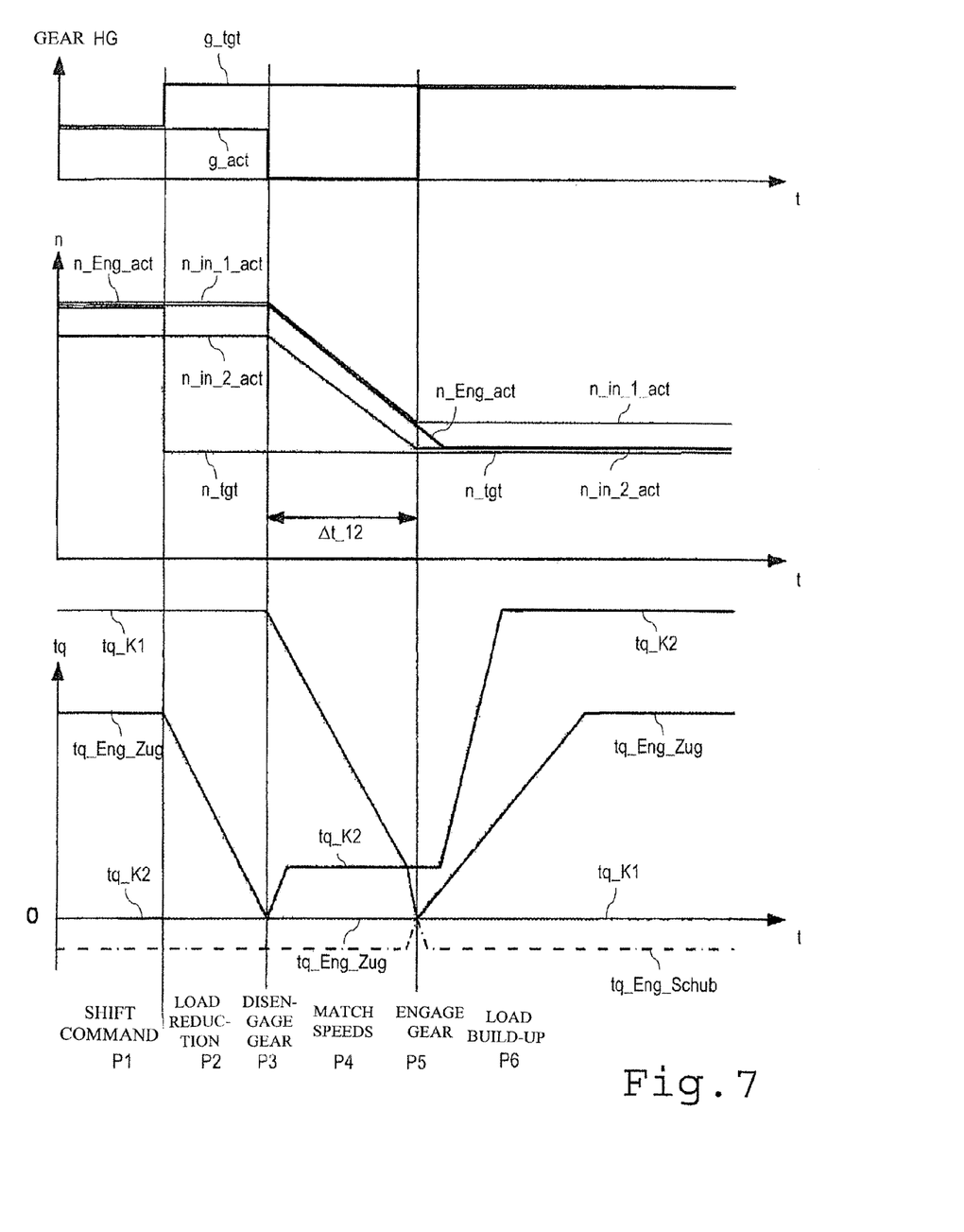
FIG. 7: A gear, speed and torque diagram to explain the carrying out of a shift sequence according to the invention, initially with one torque-free clutch and one closed clutch.

FIG. 7 shows a shift sequence in which, in each phase P1 to P6, at least one clutch K1, K2 is closed or partially closed. The gear and speed variations correspond to those of the normal shift (FIG. 6). The load-transmitting clutch changes again from K1 to K2. At the beginning of the speed adaptation the currently load-transmitting clutch K1 is still closed during the load decrease, while the engine torque falls continually to zero load. Thus, when the original gear is disengaged one clutch K1 is closed and the other clutch K2 is open.

During the speed adaptation the closed clutch K1 is gradually opened, while the other clutch K2 is operating with slip. When the two clutch torques tq_K1, tq_K2 are both in the slipping condition, the opening process of the first clutch K1 is speeded up. The target gear can again be engaged (P5) when the speed n_in_2_act of the second clutch K2, which transmits the load after the shift, has reached the target speed n_tgt.

At the end of the speed adaptation the slipping clutch K2 is not completely opened and, with a short delay after the gear engagement, it is again actuated in the closing direction. At the moment when the gear is engaged, the first clutch K1 is already fully open. During a thrust shift the negative thrust torque at the drive engine would therefore disappear briefly for engaging the gear.

Figure 8:
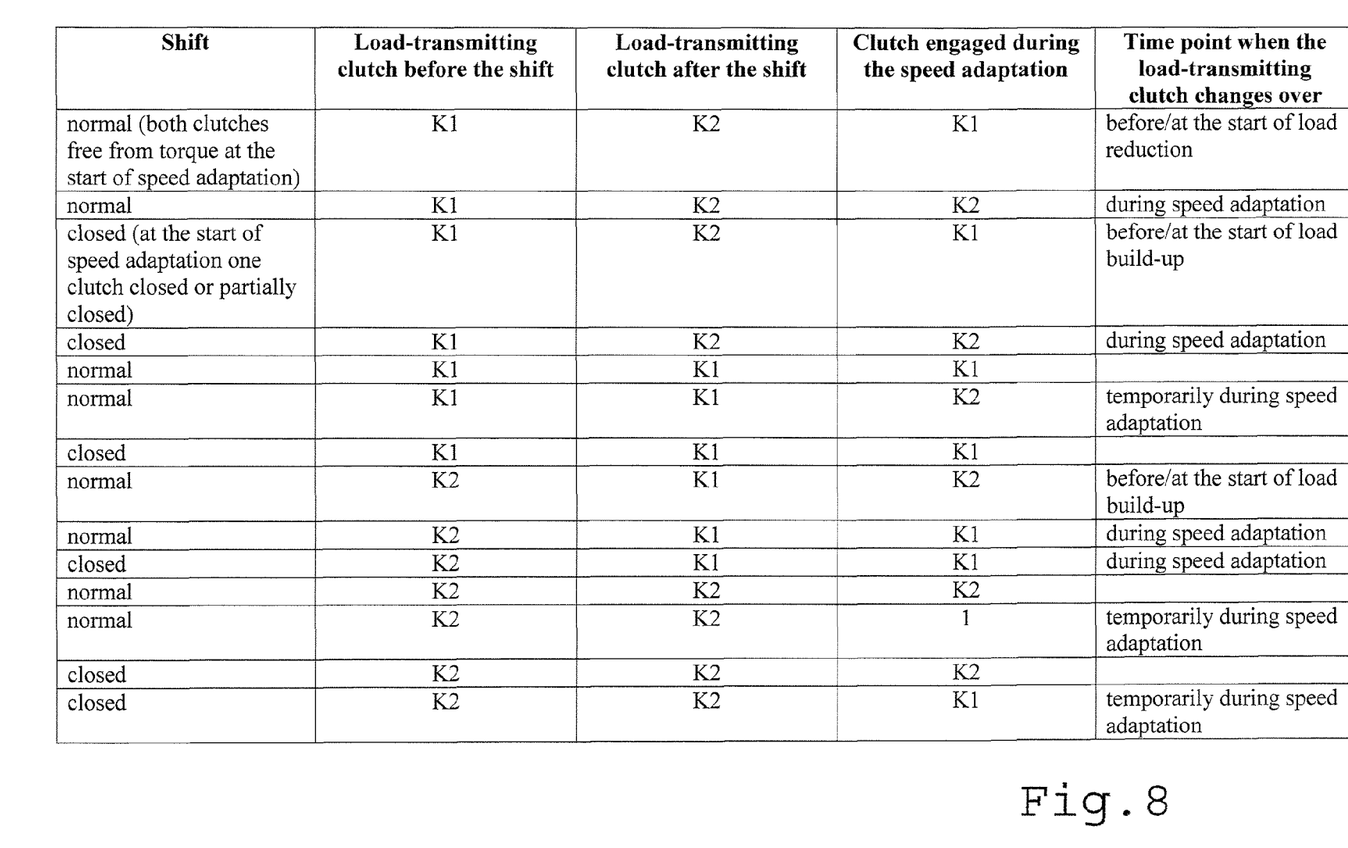
FIG. 8: A tabulated summary of shift sequences according to the invention, showing the clutch actuations associated with each.

The diagrams described with reference to FIGS. 6 and 7 are to be understood as example shift sequences. Other shift sequences, not illustrated here with diagrams, are also possible. In conclusion, therefore, all suitable variants are reviewed in summary in the following list and represented in tabulated form in FIG. 8.

(1) FIG. 6: normal shift sequence. Change of the load-transmitting clutch from K1 to K2 due to the shift. During the speed adaptation K1 is closed and therefore synchronous with the engine speed. The load-transmitting clutch changes before or at the beginning of the load build-up.

(2) Normal shift sequence. Change of the load-transmitting clutch from K1 to K2 due to the shift. During the speed adaptation K2 is closed, i.e. synchronous with the engine speed. The load-transmitting clutch changes during the speed equalization.

(3) FIG. 7: Shift sequence with closed or partially closed clutch. Change of the load-transmitting clutch from K1 to K2 due to the shift. During the speed adaptation K2 is closed, i.e. synchronous with the engine speed. The load-transmitting clutch changes during the speed equalization.

(4) Shift sequence with closed or partially closed clutch. Change of the load-transmitting clutch from K1 to K2 due to the shift. During the speed adaptation K2 is closed, i.e. synchronous with the engine speed. The load-transmitting clutch changes during the speed equalization.

(5) Normal shift sequence. No change of the load-transmitting clutch K1 due to the shift: during the speed adaptation K1 is closed, i.e. synchronous with the engine speed.

(6) Normal shift sequence. No change of the load-transmitting clutch K1 due to the shift. During the speed adaptation K2 is closed, i.e. synchronous with the engine speed. Temporary change of the load-transmitting clutch during the speed adaptation.

(7) Shift sequence with closed or partially closed clutch. No change of the load-transmitting clutch due to the shift. During the speed adaptation K1 is closed, i.e. synchronous with the engine speed.

(8) Normal shift sequence. Change of the load-transmitting clutch from K2 to K1 due to the shift. During the speed adaptation K2 is closed, i.e. synchronous with the engine speed. The load-transmitting clutch changes before or at the beginning of the speed equalization.

(9) Normal shift sequence. Change of the load-transmitting clutch from K2 to K1 due to the shift. During the speed adaptation K1 is closed, i.e. synchronous with the engine speed. The load-transmitting clutch changes during the speed equalization.

(10) Shift sequence with closed or partially closed clutch. Change of the load-transmitting clutch from K2 to K1 due to the shift. During the speed adaptation K1 is closed, i.e. synchronous with the engine speed. The load-transmitting clutch changes during the speed equalization.

(11) Normal shift sequence. No change of the load-transmitting clutch K2 due to the shift: during the speed adaptation K2 is closed, i.e. synchronous with the engine speed.

(12) Normal shift sequence. No change of the load-transmitting clutch K2 due to the shift. During the speed adaptation K1 is closed, i.e. synchronous with the engine speed. Temporary change of the load-transmitting clutch during the speed adaptation.

(13) Shift sequence with closed or partially closed clutch. No change of the load-transmitting K2 due to the shift. During the speed adaptation K2 is closed, i.e. synchronous with the engine speed.

(14) Shift sequence with closed or partially closed clutch. No change of the load-transmitting clutch K2 due to the shift. During the speed adaptation K1 is closed, i.e. synchronous with the engine speed. Temporary change of the load-transmitting clutch during the speed adaptation.

LIST OF INDEXES

AB Drive output shaft
AW Drive input shaft
DK Dual clutch
DKG Dual-clutch transmission
DKG1 Dual-clutch transmission branch
DKG2 Dual-clutch transmission branch
F1-F19 Function block
g_tgt Target gear
g_act_1 Current gear
g_act_2 Current gear
gDK_tgt Target gear in the dual-clutch transmission
gDK_act_1 Current gear in the dual-clutch transmission
gDK_act_2 Current gear in the dual-clutch transmission
GE1 Transmission input shaft
GE2 Transmission input shaft
HG Main transmission
i_1 Input gear ratio of the dual-clutch transmission
i_2 Input gear ratio of the dual-clutch transmission
i_HG1 Main transmission gear
i_HG2 Main transmission gear
K1 Clutch
K2 Clutch
M Drive engine
n_ab Output speed at the dual-clutch transmission
n_ab_HG Output speed at the main transmission
n_Eng_act_1 Current engine speed
n_Eng_act_2 Current engine speed
n_in_1_act Transmission input speed at clutch K1
n_in_2_act Transmission input speed at clutch K2
n_K1 Clutch output speed
n_K2 Clutch output speed
n_M Engine speed
n_tgt Target speed of engine, transmission input
P1-P6 Shift sequence phases
S Shifting clutch, claw clutch
t Time
t_0 Time point
t_2-1 Time point
t_2-2 Time point
tq_Eng_Schub Engine torque during a thrust shift
tq_Eng_Zug Engine torque during a traction shift
tq_K1 Clutch torque that can be transmitted at K1
tq_K2 Clutch torque that can be transmitted at K2
tq_M Engine torque
VW1 Countershaft
z11 Gearwheel
z12 Gearwheel
z21 Gearwheel
z22 Gearwheel
z31 Gearwheel
z32 Gearwheel
z41 Gearwheel
z42 Gearwheel
Δt_12 Speed adaptation time
Δt_W Delay time
Δt_S Speed adaptation delay

The invention claimed is:

1. A method of controlling shifts in a vehicle transmission with either a transmission or a partial transmission made as a dual-clutch transmission (DKG) that shifts without traction force interruption and which comprises a dual clutch (DK) having a first clutch (K1) and a second clutch (K2) that are functionally connected to a drive engine (M), and a transmission or partial transmission being made as a main transmission (HG) that shifts with traction force interruption and is connected in a drive-train downstream from the dual-clutch transmission (DKG), the method comprising the steps of:
operating the dual clutch (DK) as at least one of a transmission brake and an engine brake by pre-loading the first and the second clutches (K1, K2), during shifts of the main transmission (HG) connected downstream from the dual-clutch transmission (DKG), to adapt the rotational speed of components to be shifted.

2. The method according to claim 1, further comprising the step of making a distinction between a first shift sequence, in which at a beginning of a speed adaptation, both first and the second clutches (K1, K2) are at least, to a large extent, free from torque, and a second shift sequence in which, at the beginning of the speed adaptation, one of the first and the second clutches (K1, K2) is free from torque and the other of the first and the second two clutches (K1, K2) is engaged and transmitting torque.

3. The method according to claim 1, further comprising the step of operating, during the speed adaptation, one of the first and the second clutches (K1, K2) and operating the other of the first and the second clutches with slip.

4. The method according to claim 1, further comprising the step of with regard to relevant gear ratio considerations, the clutch (K1, K2) that is to be operated engaged either is, or remains, engaged at least far enough so that the clutch (K1, K2) can transmit a certain pre-load torque without slipping.

5. The method according to claim 1, further comprising the step of with regard to relevant gear ratio considerations, the clutch (K1, K2) that is to be operated with slip is only engaged far enough so that a certain pre-load torque is still transmitted by the engaged clutch (K1, K2), without the engaged clutch (K1, K2) slipping.

6. The method according to claim 1, further comprising the step of providing at least one dual-clutch transmission branch (DKG1, DKG2) of the dual-clutch transmission (DKG) with more than one gear, and determining a faster-running and a slower-running of the first and the second clutches (K1, K2) to carry out a shift in the main transmission (HG), and otherwise storing in advance the faster-running and the slower-running of the first and the second clutches (K1, K2) in a control unit.

7. The method according to claim 1, further comprising the step of categorizing shifts at least in accordance with the following criteria:
a) gearshift in the dual-clutch transmission (DKG) and in the main transmission (HG) with change of the load-transmitting clutch, or gearshift in the main transmission (HG) alone,
b) change of the first and the second clutches (K1, K2) from the faster to the slower clutch (K1, K2) or vice-versa, and
c) degree of engagement of the first clutch (K1) and of the second clutch (K2).

8. The method according to claim 1, further comprising the step of controlling the dual clutch (DK) as a function of a target criteria of at least one of performance, comfort, wear and further criteria.

9. The method according to claim 1, further comprising the step of selecting, for performance-orientated shifts, the clutch (K1, K2) that should operate with slip and the clutch (K1, K2) that should operate engaged so as to obtain as short as possible a time for the speed adaptation.

10. The method according to claim 1, further comprising the step of, for performance-orientated shifts in which the same clutch (K1, K2) of the dual-clutch transmission branch (DKG1, DKG2) is load-transmitting both before and after the shift, if the other, currently unused dual-clutch transmission branch (DKG1, DKG2) has more than one gear, selecting a gear therein so as to obtain as short as possible a time for the speed adaptation.

11. The method according to claim 1, further comprising the step of for selecting the slipping and the engaged clutch (K1, K2) and the gear in a multi-gear, currently unused dual-clutch transmission branch (DKG1, DKG2), carrying out a time estimation with reference to at least one of the following predetermined, measured parameters and parameters calculated using either algorithms or magnitudes derived therefrom:

a) relevant gear ratio conditions in the dual-clutch transmission (DKG),
b) a speed reduction due to gearshift in the dual-clutch transmission (DKG),
c) a speed change at the output of the dual-clutch transmission (DKG),
d) maximum torques that can be transmitted by the first and the second clutches (K1, K2),
e) an effective active mass moment of inertia,
f) a engine speed difference at the drive engine (M) to be reduced, and
g) a braking torque that can be provided at the drive engine (M).

12. The method according to claim 1, further comprising the step of determining a time duration of the speed adaptation by pre-loading the dual clutch (DK) with one engaging and one slipping clutch (K1, K2), including a gearshift in the dual-clutch transmission (DKG), until synchronous rotation of the components to be shifted is reached, when a target gear can be engaged in the main transmission (HG), from the following equation:

$$\Delta t = \Delta \omega\_M / tq\_M \cdot J\_M\_Red,$$

with $\Delta \omega\_M$ being an angular speed change at the drive engine,
$tq\_M$ being a braking torque produced at the drive engine, and
$J\_M\_Red$ being a total mass moment of inertia reduced to the engine level.

13. The method according to claim 1, further comprising the step of taking into account, when determining the effective mass moment of inertia, auxiliary drive output components that can be coupled and decoupled in accordance with their operating condition.

14. The method according to claim 1, further comprising the step of taking into account, when determining the effective mass moment of inertia, determined current wear conditions of the first and the second clutches (K1, K2).

15. The method according to claim 1, further comprising the step of taking into account a predicted change of the vehicle's speed, in determining the engine speed difference to be reduced by the speed adaptation until engagement of a target gear.

16. The method according to claim 1, further comprising the step of taking into account, in determining engine speed difference, a speed change of the drive engine (M) during a time delay caused by a gearshift in the currently unused dual-clutch transmission branch (DKG1, DKG2), and then taking into account the time delay when determining the time required for the speed adaptation.

17. The method according to claim 1, further comprising the step of taking into account maximum clutch torques, which cannot or must not be exceeded, or to exceed which would take a disproportionately long time, in determining the engine braking torque.

18. The method according to claim 1, further comprising the step of assuming an average clutch torque of the slipping clutch (K1, K2) in determining the engine braking torque.

19. The method according to claim 18, further comprising the step of defining the average clutch torque assumed, is closer to a final value, the larger the speed difference to be overcome for the speed adaptation is.

20. The method according to claim 1, further comprising the step of predictively carrying out a gearshift in the currently unused dual-clutch transmission branch (DKG1, DKG2), if the load-transmitting clutch (K1, K2) remains unchanged by the next shift to be expected.

21. The method according to claim 1, further comprising the step of engaging, for comfort-orientated shifts, the clutch (K1, K2) during the speed adaptation, which will be the load-transmitting clutch following the shift.

22. The method according to claim 1, further comprising the step of for wear-orientated shifts, only actuating whichever clutch (K1, K2) is selected in each case as the slipping clutch as the transmission brake if, with a currently determined load, this is permitted by a previously determined load reserve of the clutch (K1, K2), and if necessary actuating the other of the first and the second clutches (K1, K2) as the slipping clutch.

23. The method according to claim 22, further comprising the step of taking into account, in determining the load reserve of the clutch (K1, K2), in each case, shortly to be expected subsequent to the shift process of the clutch.

24. The method according to claim 22, further comprising the step of taking into account, in determining the load reserve of the clutch (K1, K2), in each case at least one of clutch-specific and environment-specific parameters and parameters pertaining to the specific field of use of the vehicle.

25. The method according to claim 1, further comprising the step of operating the dual clutch (DK) as at least one of the transmission brake and the engine brake, if either a predicted relevant clutch load is below a limit value or if an actual clutch load, increased by a predicted additional frictional energy input, is below a limit value.

26. The method according to claim 1, further comprising the step of operating the dual clutch (DK) as at least one of the transmission brake and the engine brake, if a rapid shift is deemed necessary and this is indicated by either a driver's wish or an active kick-down position of an accelerator pedal and a current driving resistance is comparatively high.

27. The method according to claim 1, further comprising the step of operating the dual clutch (DK) as at least one of the transmission brake and the engine brake if this is recognized as appropriate with regard to either a predefined comfort level or a performance level.

28. The method according to claim 1, further comprising the step of operating the dual clutch (DK) as at least one of the transmission brake and the engine brake if a target speed of the speed adaptation is either greater than or equal to an idling speed of the drive engine.

29. The method according to claim 1, further comprising the step of operating the dual clutch (DK) as at least one of the transmission brake and the engine brake when, if the speed falls below the idling speed, an idling regulation system in an engine control unit is temporarily suppressed.

30. The method according to claim 1, further comprising the step of operating the dual clutch (DK) as at least one of the transmission brake and the engine brake, if the actuation of the dual clutch (DK), as a brake, is terminated when the speed either reaches or at most falls slightly below the idling speed.

\* \* \* \* \*